(12) United States Patent
Stock et al.

(10) Patent No.: US 7,972,401 B2
(45) Date of Patent: Jul. 5, 2011

(54) AIR INTAKE FILTER ASSEMBLY

(75) Inventors: Darrell A. Stock, Huntersville, NC (US); Charles E. Edwards, Cornelius, NC (US); Michael J. Gross, Troutman, NC (US); Brad D. Aikin, Huntersville, NC (US)

(73) Assignee: Ingersoll-Rand Company, Montvale, NJ (US)

( * ) Notice: Subject to any disclaimer, the term of this patent is extended or adjusted under 35 U.S.C. 154(b) by 787 days.

(21) Appl. No.: 11/422,251

(22) Filed: Jun. 5, 2006

(65) Prior Publication Data
US 2006/0272302 A1 Dec. 7, 2006

Related U.S. Application Data

(60) Provisional application No. 60/687,716, filed on Jun. 6, 2005.

(51) Int. Cl.
*B01D 59/50* (2006.01)
(52) U.S. Cl. ........... 55/483; 55/315; 55/359; 55/482; 55/486; 55/490; 55/492; 55/493
(58) Field of Classification Search ........ 16/50; 55/315, 55/359, 482, 483, 486, 490, 492, 493, 505, 55/506, 511, 385.4
See application file for complete search history.

(56) References Cited

U.S. PATENT DOCUMENTS

| | | | |
|---|---|---|---|
| 1,390,105 A * | 9/1921 | Erwin | 292/247 |
| 2,044,221 A | 6/1936 | Myers et al. | |
| 2,992,701 A | 7/1961 | White | |
| 3,576,095 A | 4/1971 | Rivers | |
| 4,519,823 A * | 5/1985 | Kinney et al. | 55/493 |
| 4,610,705 A * | 9/1986 | Sarnosky et al. | 96/135 |
| 4,678,489 A * | 7/1987 | Bertelsen | 96/135 |
| 4,713,099 A * | 12/1987 | Schroeder | 55/385.1 |

(Continued)

FOREIGN PATENT DOCUMENTS
DE 19645447 5/1998
(Continued)

OTHER PUBLICATIONS
The American Heritage Dictionary of the English Language: Fourth Edition. 2000.*
(Continued)

*Primary Examiner* — Jason M Greene
*Assistant Examiner* — Anthony Shumate
(74) *Attorney, Agent, or Firm* — Michael Best & Friedrich LLP

(57) ABSTRACT

An air intake filter assembly for filtering air flowing from a front end to a rear end includes a housing, a first filter stage, and a second filter stage. The filter stages are insertable in and removable from the housing. A latch is movable between a latched position in which the first filter stage is secured to the housing, and an unlatched position in which the first filter stage is not secured to the housing. A hinge is formable between the housing and the first filter stage, and the hinge allows the first filter stage to pivot with respect to the housing when the latch is in the unlatched position. When the first filter stage and the second filter stage are inserted in the housing and the latch is in the latched position, then the first filter stage is compressed against the second filter stage, which is compressed against the housing.

22 Claims, 6 Drawing Sheets

U.S. PATENT DOCUMENTS

| | | | |
|---|---|---|---|
| 5,332,409 A * | 7/1994 | Dralle | 55/484 |
| 5,512,074 A | 4/1996 | Hanni et al. | |
| 5,569,311 A | 10/1996 | Oda et al. | |
| 5,604,954 A * | 2/1997 | Webster et al. | 15/330 |
| 5,620,505 A | 4/1997 | Koch et al. | |
| 5,803,940 A | 9/1998 | Rick et al. | |
| 5,944,860 A * | 8/1999 | Mack et al. | 55/492 |
| 6,045,598 A | 4/2000 | Fath et al. | |
| 6,231,630 B1 | 5/2001 | Ernst et al. | |
| 6,294,004 B1 | 9/2001 | Summers et al. | |
| 6,348,077 B1 | 2/2002 | Solberg, Jr. et al. | |
| 6,353,967 B1 * | 3/2002 | Escobar et al. | 16/331 |
| 6,387,164 B1 * | 5/2002 | Cheng | 96/66 |
| 6,526,773 B1 | 3/2003 | Cho | |
| 6,676,721 B1 | 1/2004 | Gillingham et al. | |
| 6,875,250 B2 * | 4/2005 | Terlson | 55/497 |
| 2003/0205039 A1 | 11/2003 | Terlson | |
| 2004/0060147 A1 * | 4/2004 | Ashe | 15/347 |
| 2004/0163368 A1 * | 8/2004 | Lee et al. | 55/429 |

FOREIGN PATENT DOCUMENTS

| | | |
|---|---|---|
| WO | 2005094655 | 10/2005 |

OTHER PUBLICATIONS

The American Heritage Dictionary of the English Language: Fourth Edition. 2000.*

* cited by examiner

AIR INTAKE FILTER ASSEMBLY

CROSS REFERENCE TO OTHER APPLICATIONS

This application claims priority under 35 U.S.C. sec. 119 to provisional patent application No. 60/687,716, filed on Jun. 6, 2005, which is hereby incorporated by reference.

FIELD OF THE INVENTION

The invention relates to an air intake filter assembly for industrial machinery such as an air compressor or blower, and in particular to an air intake filter assembly including removable filter stages.

BACKGROUND OF THE INVENTION

Compressors and blowers having stationary and moving components and handling atmospheric industrial quality air must be protected from ingesting, at their intake, suspended solids present in the accelerated air stream. Large size solids suspended in the air stream can impart mechanical damage to the moving and stationary components of these machines, and small size suspended solids can, with time, deteriorate the mechanical and thermodynamic performance of the machinery by accumulating on the stationary and moving surfaces thereof and on any stationary heat exchanging surfaces located along the air path. One or more air intake filters are typically used to prevent the contamination and consequent damage to compressors and blowers from particles present in an industrial atmosphere, and a wide range of designs is available to meet the air-cleaning requirements for a specific compressor application.

The physical size of an air intake filter assembly is directly determined by the amount of atmospheric air flow handled by the downstream compressor or blower. An air intake filter assembly, in typical industrial applications, is remotely located from the compressor or blower, or is integrated within a confining enclosure or canopy that also contains the compressor and its auxiliary components.

SUMMARY OF THE INVENTION

In one embodiment, an air intake filter assembly for filtering air flowing from a front end to a rear end of the assembly includes a housing, a first filter stage for filtering the air received at the front end, the first filter stage insertable in and removable from the housing, a second filter stage for filtering air that has passed through the first filter stage, the second filter stage insertable in and removable from the housing, and a latch having a latched position in which the first filter stage is secured to the housing, and an unlatched position in which the first filter stage is not secured to the housing. A hinge formable between the housing and the first filter stage when the first filter stage is inserted in the housing allows the first filter stage to pivot with respect to the housing. When the first filter stage and the second filter stage are inserted in the housing and the latch is in the latched position, the first filter stage is compressed against the second filter stage and the second filter stage is compressed against the housing to insure that the air exiting the assembly has passed through both filter stages.

In another embodiment, an air intake filter assembly for filtering air flowing from a front end to a rear end of the assembly includes a housing, a first filter stage including a first filter element for filtering the air received at the front end, the first filter stage insertable in and removable from the housing, a second filter stage including a second filter element for filtering the air that has passed through the first filter stage, the second filter stage insertable in and removable from the housing, and a latch having a latched position in which the first filter stage is secured to the housing, and an unlatched position in which the first filter stage is not secured to the housing. A slot and tab hinge is formable between the housing and the first filter stage and opposite the latch, wherein the hinge allows the first filter stage to pivot with respect to the housing when the latch is in the unlatched position. When the first filter stage and the second filter stage are inserted in the housing, the hinge is formed between the housing and the first filter stage, and the latch is in the latched position, then the first filter stage is compressed against the second filter stage and the second filter stage is compressed against the housing to insure that the air exiting the assembly has passed through both filter elements.

BRIEF DESCRIPTION OF THE DRAWINGS

The detailed description particularly refers to the accompanying figures in which.

DETAILED DESCRIPTION

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

Figures 1A, 1B:
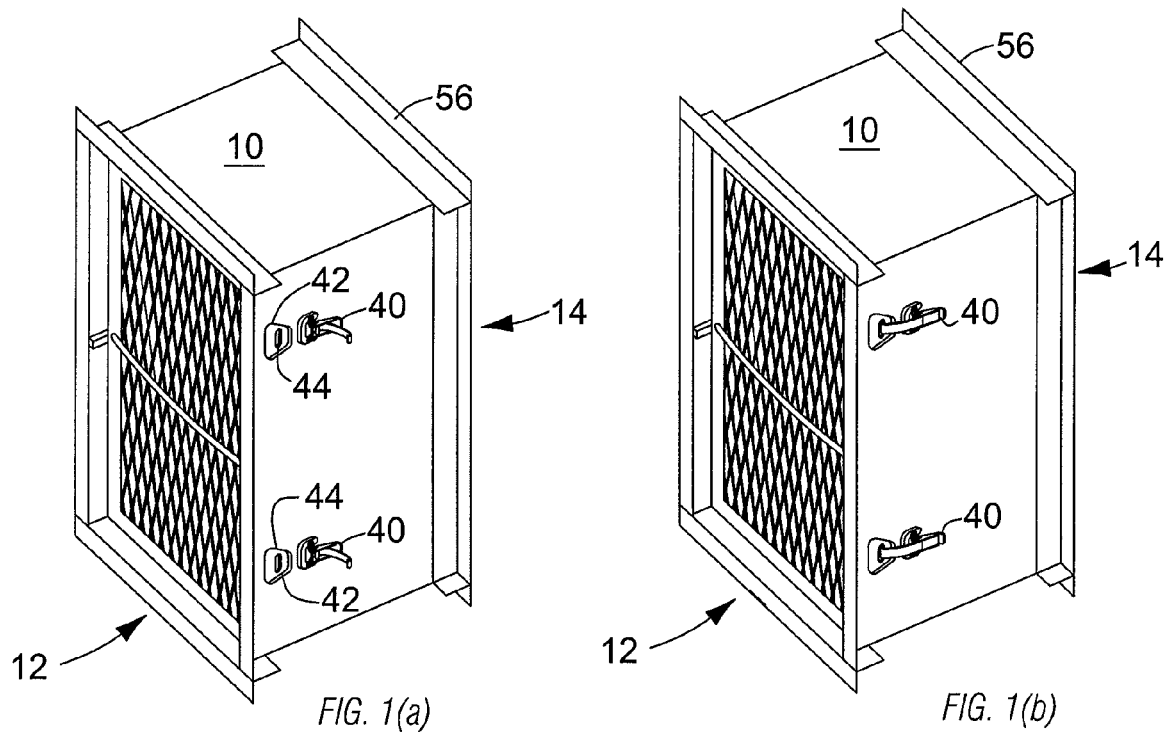
FIGS. 1(a) and (b) illustrate a perspective view of one embodiment of an assembled air intake filter assembly with the latches respectively unlatched and latched.

A perspective view of one embodiment of an assembled air intake filter assembly 10 is shown in FIGS. 1(*a*) and 1(*b*). As a general overview, air enters the air intake filter assembly 10 at a front end 12, flows through two filter stages 16, 18 (shown unassembled in FIG. 2), and exits the assembly 10 as filtered air at a back end 14. Such an assembly 10 is appropriate to filter the air flowing into machinery such as an industrial size air compressor or blower.

Figure 2:
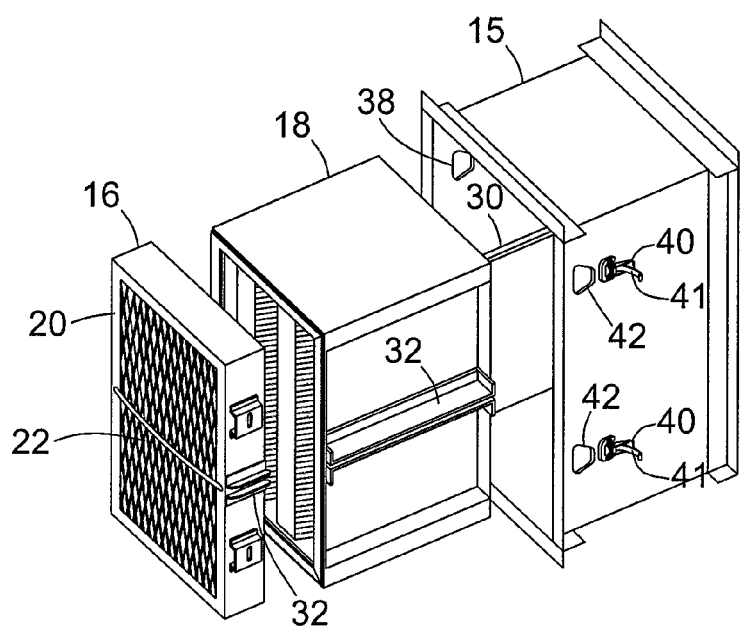
FIG. 2 is an exploded perspective view of the air intake filter assembly of FIG. 1.

With reference to FIG. 2, the air intake filter assembly 10 includes a housing 15 in addition to the first filter stage 16 and the second filter stage 18. Both filter stages 16, 18 are easily inserted in and removed from the housing 15. The first filter stage 16 includes a frame 20 and a first filter element 22 and is designed to filter relatively larger particles in the air. The second filter stage 18 includes a frame 24 and one or more second filter elements 26 and is designed to filter relatively smaller particles in the air. Because the first filter stage 16 filters relatively larger particles, the first filter element 22 will generally need more frequent replacement than filter elements 26 in the second filter stage 18.

In one embodiment, the housing 15 is generally box-shaped with four sides and is generally open at the front end 12 as well as the back end 14 for air flow. To assemble the air intake filter assembly 10, the second filter stage 18 is first inserted into the housing 15 at the front end 12, coming to rest against a stop 28 (shown in FIG. 7(*b*)) in the housing 15 at the back end 14. The first filter stage 16 is then inserted and latched into position. When removing filter stages, in the preferred embodiment, the first filter stage 16 is removed prior to removing the second filter stage 18, since the second filter stage 18 is preferably not removable from the back end 14.

Figure 3A:
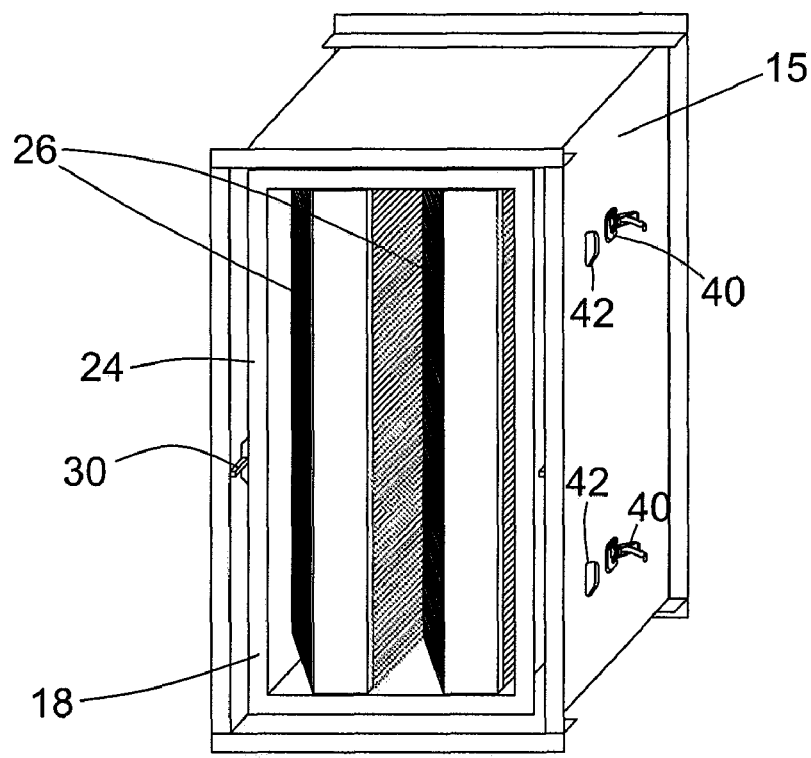
FIG. 3(a) is a front view of the air intake filter assembly of FIG. 1 with only the second filter stage installed.
Figure 3B:
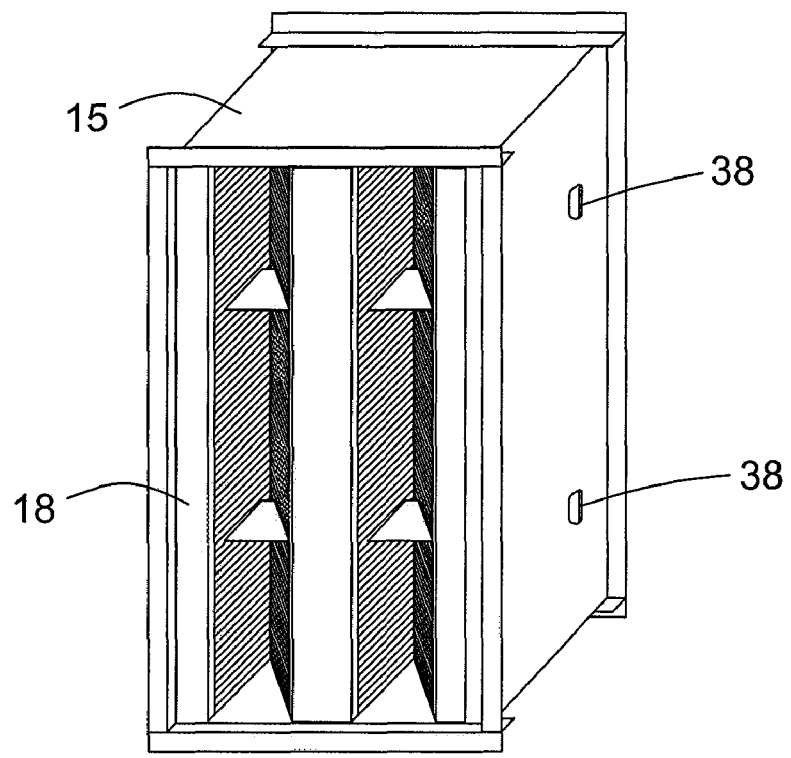
FIG. 3(b) is a rear view of the air intake filter assembly of FIG. 1 with the second filter stage installed.

Referring to FIGS. 2 and 3(*a*), in one embodiment, rail elements 30 are provided to facilitate the insertion, removal, support, and positioning of both filter stages 16, 18 within the housing 15. As shown, the interior of the housing 15 includes a first rail element 30 on each of two opposite sides. These elements 30 extend substantially from the front end 12 to the back end 14 of the housing 15. Further, the first filter stage 16 and the second filter stage 18 each include a second rail element, such as in the form of a rail receptacle 32, exteriorly mounted on each of two opposite sides. The first rail elements 30 on the housing 15 and the second rail elements formed as rail receptacles 32 on a filter stage interact such that the first and second filter stages 16, 18 each can be easily slid into and out of the housing 15, and are each correctly positioned and supported within the housing 15. In some embodiments, the positions of the rail receptacles 32 on the filter stages 16, 18 and the rail elements 30 on the housing 15 can be interchanged.

As shown in FIGS. 3(*a*), 3(*b*), 5(*a*), and 5(*b*), in one embodiment, the second filter stage 18 includes several filter elements 26 arranged to form V's or V-shapes, while the first filter stage 16 includes a single filter element 22. The filter elements 22, 26 preferably are panel dry-type media. Dry-type media are usually constructed with fabric-like or blanket-type materials of varying density, thickness, and composition. The dry-type filter media may be cellulose fibers, banded glass, wool felt, synthetics and similar fibers. Dry-type filter media are known for their high efficiency in removing particles of various physical sizes as found in an industrial atmosphere, and are characterized by fiber size and closeness of the fibers to achieve the desired filtration efficiency.

In one embodiment, these filter elements 26 of the second filter stage 18 are a high filtration efficiency, dry-type, panel filter element including filter media characterized by a deep, multi-layer pattern design to achieve up to ninety-nine-point-nine-seven percent filtration efficiency for particle size of the order of two micrometers or greater. The filter element 22 of the first filter stage 16 preferably includes a high filtration efficiency, dry-type media designed to filter particles of a physical size equal to or greater than ten micrometers. Particle sizes in air in an industrial atmosphere typically range from about thirty micrometers to less than zero-point-five micrometers. Particle sizes between ten and thirty micrometers, with an average size of twenty micrometers, typically occupy about twenty-eight percent by volume of air in an industrial atmosphere, while typically about fifty-two percent by volume of an industrial atmosphere is populated by particle sizes ranging between five and ten micrometers, with an average size of seven-point-five micrometers. This typical distribution by volume of particle sizes in air in an industrial atmosphere highlights the advantages of a multi-stage filter assembly 10 where the larger and more common particles, having sizes ranging between ten and thirty micrometers, are removed earlier from the air stream by the first filter stage 16, and the smaller size particles are then removed by the second filter stage 18. For both the first and the second filter stages 16, 18, the filter elements 22, 26 can be integral to the frame or separable therefrom. Both the housing and frames can be formed from a corrosion inhibiting material such as sheet metal.

Figure 4:
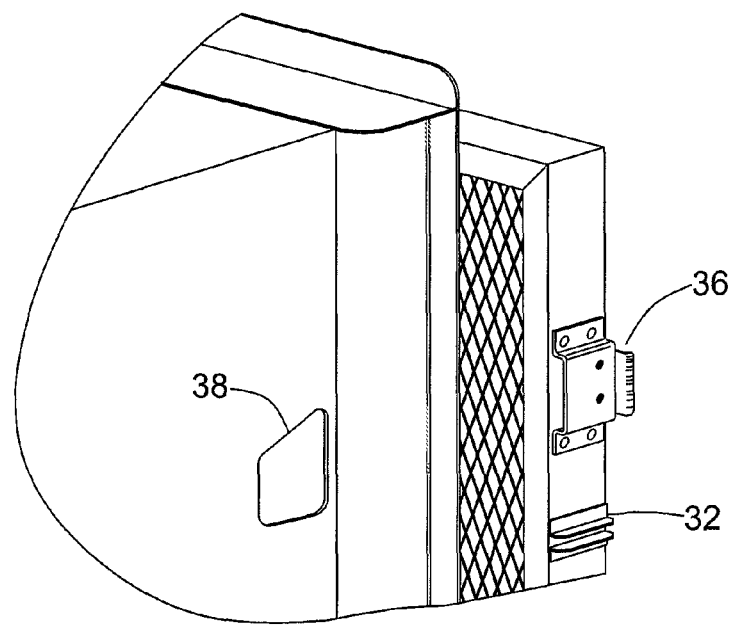
FIG. 4 is a perspective view of a tab on the first filter stage and a slot in the housing when the first filter stage is removed from the housing of the air intake filter assembly of FIG. 1.
Figure 5A:
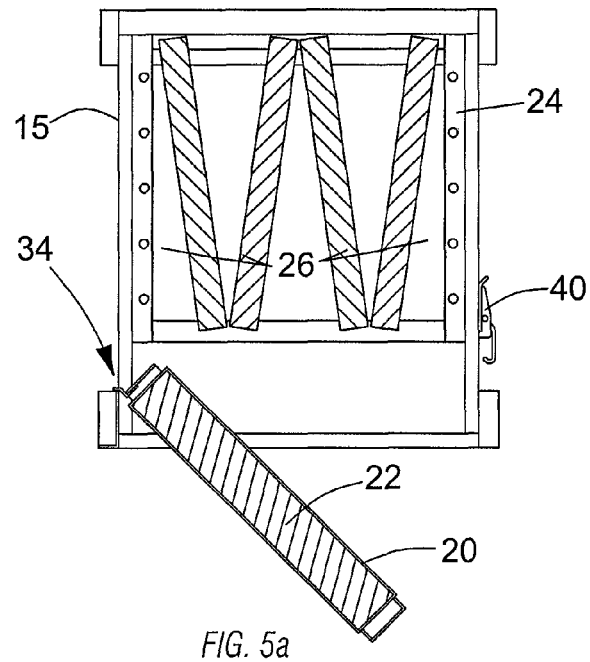
FIG. 5(a) is a simplified cross-sectional view of the tab and slot hinge formed between the housing and the first filter stage.
Figure 5B:
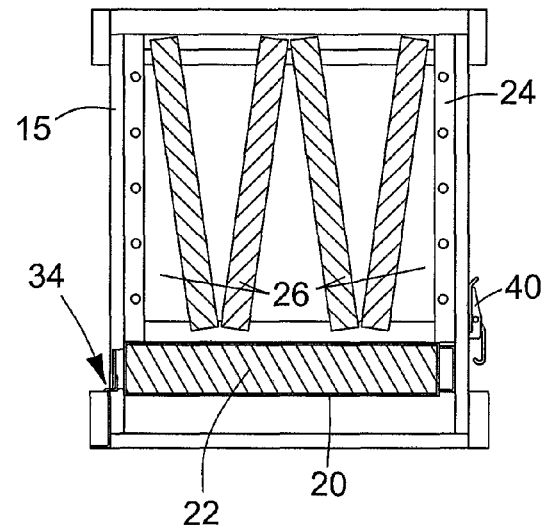
FIG. 5(b) is a view similar to FIG. 5(a), with the first filter stage pivoted to a position fully within the housing, with the first filter stage unlatched.

Once the second filter stage 18 is installed within the housing 15, the first filter stage 16 can then be installed. Referring to FIGS. 4, 5(*a*), and 5(*b*), the assembly 10 also includes one or more hinges 34 that can be formed between the housing 15 and the first filter stage 16, wherein a hinge 34 allows the first filter stage 16 to pivot with respect to the housing 15. Specifically, as shown in FIG. 4, the first filter stage 16 includes one or more outwardly extending tabs 36 which are insertable into a slot 38 in the housing 15. When a tab 36 is inserted in a corresponding slot 38, as shown in FIG. 5(*a*), a hinge 34 is formed which allows the first filter stage 16 to pivot with respect to the housing 15. The hinged first filter stage 16 can pivot from an open position, as shown in FIG. 5(*a*), to the closed position illustrated in FIG. 5(*b*).

Figure 6:
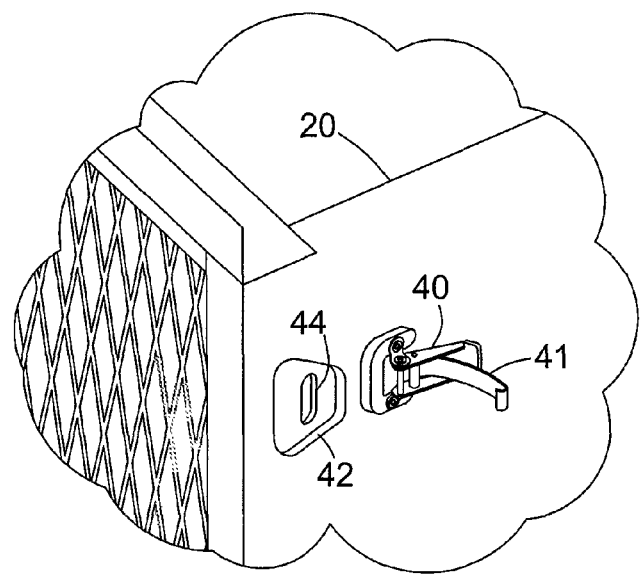
FIG. 6 is a perspective view of the air intake filter assembly of FIG. 1 wherein the first filter stage is installed in the housing and pivoted to a closed position and wherein the latches are in an unlatched state.

Once the tabs 36 are inserted into the slots 38 to form the hinges 34, and the first filter stage 16 is pivoted to a closed position within the housing, the first filter stage 16 can be secured within the housing 15 with one or more latches 40. The latches 40 are movable between an unlatched position wherein the first filter stage 16 is not secured to the housing 15 as shown in FIGS. 1(*a*) and 6, and a latched position for securing the first filter stage 16 to the housing 15, as shown in FIG. 1(*b*). Referring to FIG. 6, in one embodiment, the housing 15 includes one or more latches 40 on the side of the housing 15 opposite the hinge slots 38, and an aperture 42 adjacent to each latch 40. Preferably the latch 40 is a ski-boot type latch (sometimes referred to as a drawbolt latch or drawbolt case latch) having a hook portion 41. The aperture 42 allows the hook portion 41 to engage a slot edge 44 of the first filter stage 16 when the first filter stage 16 is pivoted to its closed position. The latch 40 can then be moved to a latched position to secure the first filter stage 16 within the housing 15. When the latch 40 is in the latched position, a compressive force is exerted in the axial direction (i.e., from front end 12 to back end 14) to press the first filter stage 16 against the second filter stage 18 and the second filter stage 18 against the stop 28 at the back end 14 of the housing 15.

Figure 7A:
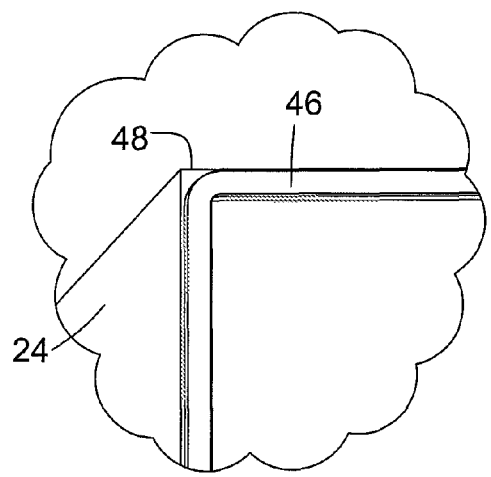
FIG. 7(a) is an illustration of a seal on a front side of the second filter stage.
Figure 7B:
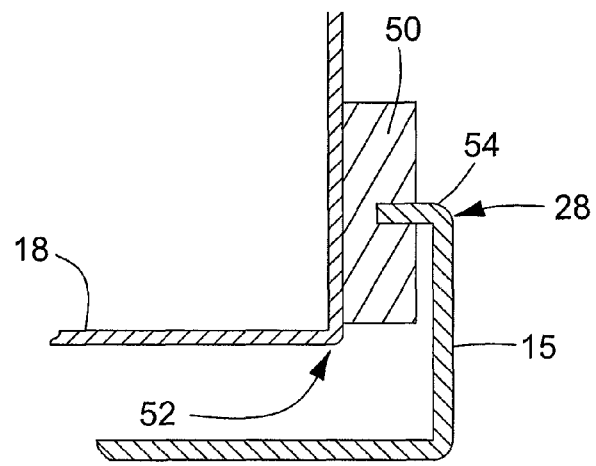
FIG. 7(b) is a cross-sectional view of a seal on the back side of the second filter stage, which interfaces with a flange on the housing.

When the latches 40 are latched, a first compressible seal element 46 located between the first filter stage 16 and the second filter stage 18 is compressed to form a first seal. As shown in FIG. 7(a), this seal element 46 can be located on the periphery of a front end 48 of the second filter stage 18. Similarly, a second compressible seal element 50 located between the second filter stage 18 and the housing 15 can be compressed to form a second seal. As shown in FIG. 7(b), this seal element 50 can be located on the periphery of a back end 52 of the second filter stage 18. An inwardly extending flange 54 on the housing 15 at the back end 14 functions both as stop 28 to the second filter stage 18, and provides a continuous knife-type edge on the housing 15 to form the second seal. Thus, the compressive force and seal elements 46, 50 insure that the air entering the air intake filter assembly 10 passes through both first and second filter stages 16, 18 (i.e, it is filtered) before flowing out at the back end 14.

The combination of hinges 34 and latches 40 allows the simple and straightforward installation and removal of the first and second filter stages 16, 18. In the illustrated embodiment, the hinge slots 38 and the apertures 42 are identical, so that the latches 40 can be located on either side of the housing 15.

Figure 8A:
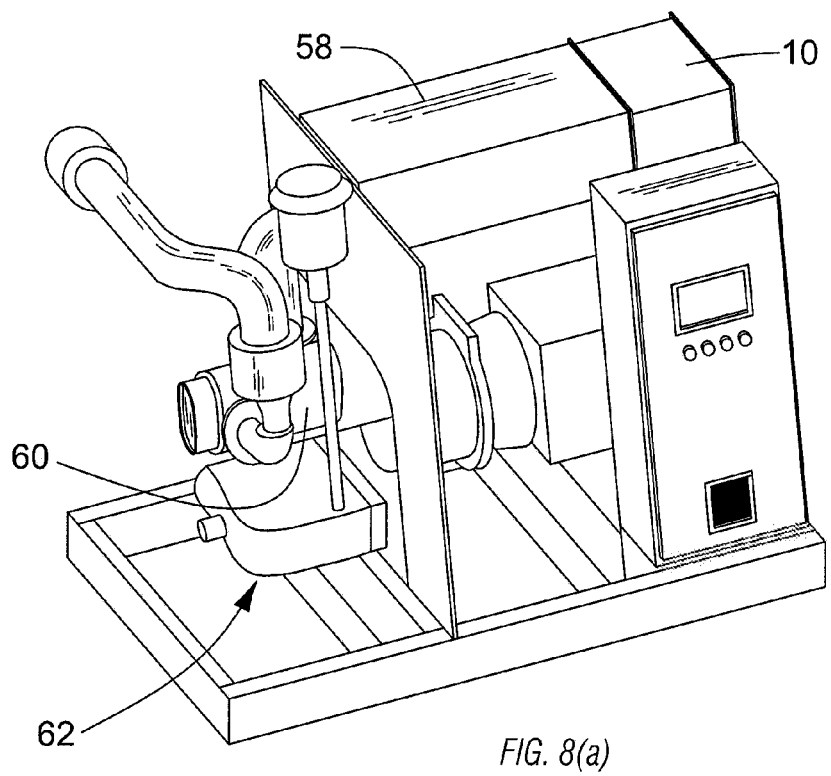
FIGS. 8(a)-(b) illustrate the location of the air intake filter assembly with respect to an air compression system within an enclosure.
Figure 8B:
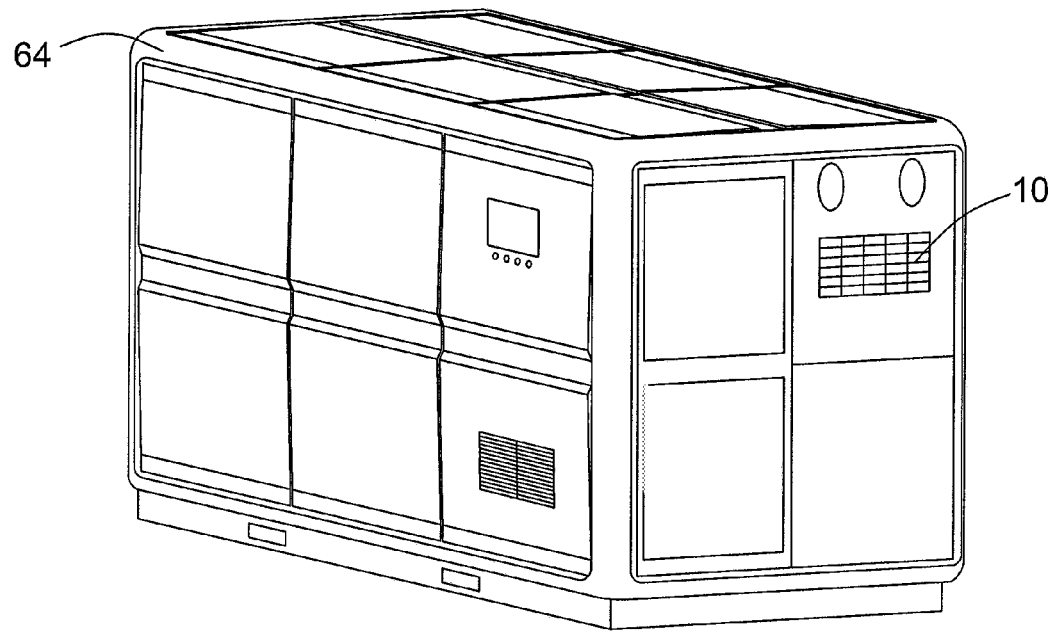

Referring again to FIGS. 1(a) and (b), in one embodiment, the housing 15 also includes at least one outwardly extending flange 56 on at the back end 14 in order to facilitate the connection of the air intake filter assembly 10 to air ducting of an air compressor. For example, as shown in FIGS. 8(a) and 8(b), the air intake filter assembly 10 can be attached to an air intake silencer assembly 58 within an air compression system 62 that includes compressor 60 and other auxiliary components within an enclosure 64. These figures illustrate the spatial constraints which are often present in an air compression system 62, such that simplicity in the positioning, support, installation and field servicing of an air intake filter assembly 10 of a relatively large size is advantageous. In the illustrated embodiment, the air filter intake assembly 10 is mounted to the air intake silencer assembly 58 near one of the upper corners of the enclosure 64. In other embodiments, the housing 15 can also include one or more other mounting devices to secure the air intake filter assembly 10 to adjacent structures of an air compression system 62.

In the illustrated embodiment, the hinges 34 are located on a side of the air intake filter assembly 10 such that the hinges 34 aid in the field servicing of the filter assembly since they support the first filter stage 16 when it is pivoted to an open position. In other embodiments, the hinge side of the assembly 10 can be oriented in a different manner. In particular, the use of a tab and slot hinge 34 allows the air intake filter assembly 10 to be mounted, without particular geometric restrictions, close to an adjacent wall of the enclosure 64, since space on the exterior of the assembly 10 at the hinge side is not required.

Figure 9:
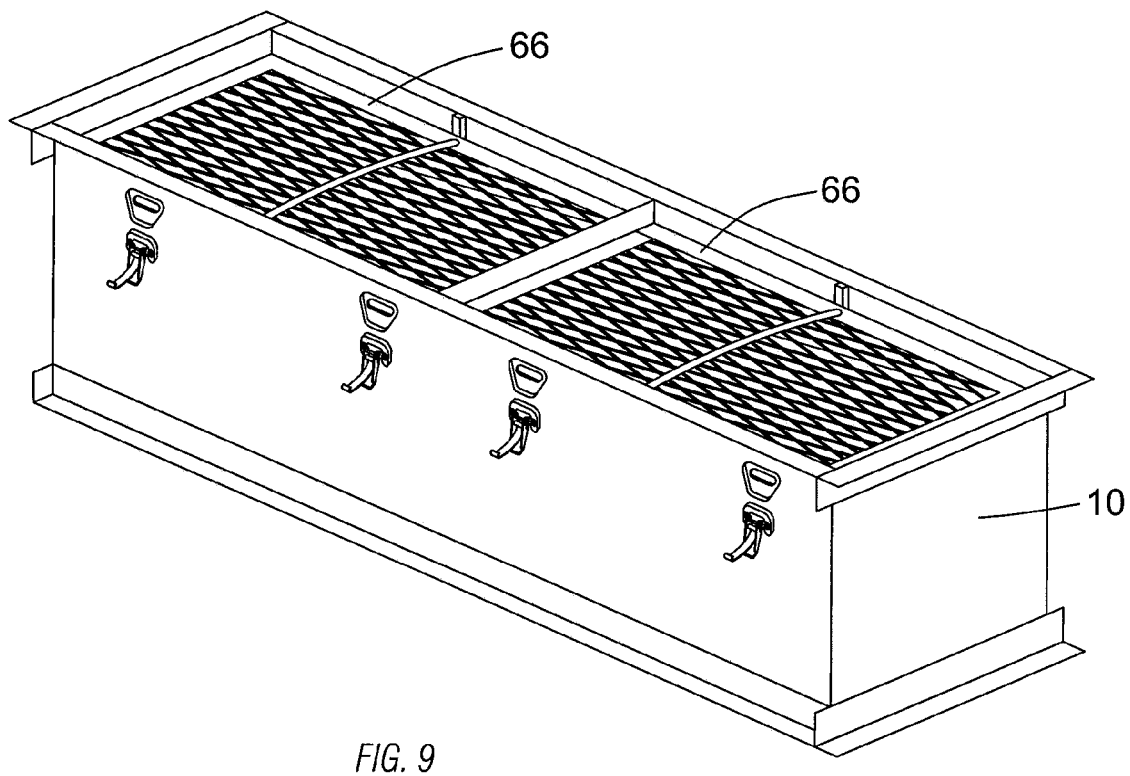
FIG. 9 illustrates another embodiment of an air intake filter assembly.

Such an assembly 10 is also modular in nature so that arrays of filter stages can be arranged, having one or more rows and one or more columns of modules 66, wherein each module 66 includes both first and second filter stages 16, 18, according to the air flow required in a particular application. One such assembly 10 is shown in FIG. 9. The modular nature of the assembly 10 allows the independent replacement of the first and/or second filter stages and/or filter elements, and permits the air handling capacity of the air intake filter assembly 10 to be easily modified to meet the requirements of a selected air compression system 62.

The air intake filter assembly 10 described herein provides improved air intake filtration for industrial air compression systems. The assembly allows for the accurate, reliable, and simple installation and removal of the filter stages to permit the rapid replacement of filter elements while allowing the positioning of the air intake filter assembly 10 in confined spaces.

What is claimed is:

1. An air intake filter assembly for filtering air flowing from a front end to a rear end of the assembly, the assembly comprising,
   a first housing,
   a first filter stage for filtering the air received at the front end, the first filter stage insertable in and removable from the first housing,
   a second filter stage for filtering air that has passed through the first filter stage, the second filter stage including a second housing and a plurality of panel filter elements supported by the second housing and arranged such that the panel filter elements are not parallel to one another, the second housing insertable in and removable from the first housing,
   a latch having a latched position in which the first filter stage is secured to the first housing, and having an unlatched position in which the first filter stage is not secured to the first housing,
   a hinge formable between the first housing and the first filter stage when the first filter stage is inserted in the first housing, the hinge allowing the first filter stage to pivot with respect to the first housing, and
   wherein the latch in the latched position compresses the first filter stage against the second housing to define a seal at a perimeter of the second housing and compresses the second housing against the first housing to define a second seal therebetween to insure that the air exiting the assembly has passed through the first filter stage and the second filter stage.

2. The air intake filter assembly of claim 1, wherein the first filter stage includes one of a tab and a slot and the first housing includes the other of a tab and a slot, and the hinge is formed by inserting the tab into the slot.

3. The air intake filter assembly of claim 2, further including a plurality of hinges formed by tabs and slots.

4. The air intake filter assembly of claim 1, wherein the latch is located on a side of the first housing opposite the hinge.

5. The air intake filter assembly of claim 1, wherein the latch is on the first housing and engages a slot edge of the first filter stage when the latch is in the latched position.

6. The air intake filter assembly of claim 1, further including a plurality of latches for securing the first filter stage to the first housing.

7. The air intake filter assembly of claim 1, further including a compressible seal element between the first filter stage and the second filter stage.

8. The air intake filter assembly of claim 1, further including a compressible seal element between the second filter stage and the first housing at the rear end.

9. The air intake filter assembly of claim 1, wherein the latch is a ski-boot latch on the first housing and the latch engages a slot edge of the first filter stage when the latch is in the latched position.

10. The air intake filter assembly of claim 1, wherein the first housing includes a first rail element, and the second filter stage includes a second rail element, and wherein the first rail element interacts with the second rail element so as to position and support the second filter stage within the first housing.

11. The air intake filter assembly of claim 1, wherein the first housing includes a first rail element, and the first filter stage includes a second rail element, and wherein the first rail element interacts with the second rail element so as to position and support the first filter stage within the first housing.

12. The air intake filter assembly of claim 1, wherein the latch generates a compressive force when in the closed position to compress the first filter stage against the second filter stage and the second filter stage against the first housing.

13. An air intake filter assembly for filtering air flowing from a front end to a rear end of the assembly, the assembly comprising,
   a first housing,
   a first filter stage including a first panel filter element for filtering the air received at the front end, the first filter stage insertable in and removable from the first housing,
   a second filter stage including a second housing, a second panel filter element supported by the second housing, and a third panel filter element supported by the second housing and oriented at an oblique angle with respect to the second panel filter element for filtering the air that has passed through the first filter stage, the second filter stage insertable in and removable from the first housing,
   a latch having a latched position in which the first filter stage is secured to the first housing, and having an unlatched position in which the first filter stage is not secured to the first housing,
   a slot and tab hinge formable between the first housing and the first filter stage and opposite the latch, wherein the hinge allows the first filter stage to pivot with respect to the first housing when the latch is in the unlatched position, and
   wherein, when the first filter stage and the second filter stage are inserted in the first housing, the hinge is formed between the first housing and the first filter stage, and when the latch is in the latched position, the first filter stage is compressed against the second housing to define a first seal at a perimeter of the second housing and the second filter stage is compressed against the first housing to insure that the air exiting the assembly has passed through the first filter element and the second filter stage.

14. The air intake filter assembly of claim 13, wherein the first filter stage includes one of a tab and a slot and the first housing includes the other of a tab and a slot, and the hinge is formed by inserting the tab into the slot.

15. The air intake filter assembly of claim 13, further including a plurality of hinges and a plurality of latches.

16. The air intake filter assembly of claim 13, wherein the latch is on the first housing and engages a slot edge of the first filter stage when the latch is in the latched position.

17. The air intake filter assembly of claim 13, further including a compressible seal element between the first filter stage and the second filter stage.

18. The air intake filter assembly of claim 13, further including a compressible seal element between the second filter stage and the first housing at the rear end.

19. The air intake filter assembly of claim 13, wherein the latch is a ski-boot latch on the first housing and the latch engages a slot edge of the first filter stage when the latch is in the latched position.

20. The air intake filter assembly of claim 13, wherein the first housing includes one of a rail element and a rail receptacle, and the second filter stage includes the other of a rail element and a rail receptacle, and wherein the rail element mates with the rail receptacle so as to position and support the second filter stage within the first housing.

21. The air intake filter assembly of claim 13, wherein the first housing includes one of a rail element and a rail receptacle, and the first filter stage includes the other of a rail element and a rail receptacle, and wherein the rail element mates with the rail receptacle so as to position and support the first filter stage within the first housing.

22. The air intake filter assembly of claim 13, wherein the latch generates a compressive force when in the closed position to compress the first filter stage against the second filter stage and the second filter stage against the first housing.

* * * * *